they are contiguous with each other such that said opposite

United States Patent

Rendessy

[15] 3,659,874

[45] May 2, 1972

[54] SWAY CONTROL FOR TRAILER HITCH

[72] Inventor: William L. Rendessy, 1839 East Moreland, Phoenix, Ariz.

[22] Filed: Jan. 16, 1969

[21] Appl. No.: 805,924

Related U.S. Application Data

[63] Continuation-in-part of Ser. No. 638,412, May 15, 1967, abandoned, and a continuation-in-part of Ser. No. 763,843, Sept. 30, 1968, abandoned.

[52] U.S. Cl. ............................................. 280/446, 280/432
[51] Int. Cl. ........................................................... B60d 7/00
[58] Field of Search ............... 280/446, 432; 74/242.8, 242.1, 74/242.12; 254/189, 190 R

[56] References Cited

UNITED STATES PATENTS

| | | | |
|---|---|---|---|
| 1,081,607 | 12/1913 | Hall | 114/160 |
| 2,612,382 | 9/1952 | Landis | 280/456 |
| 2,691,533 | 10/1954 | Koontz | 280/405 |
| 2,933,143 | 4/1960 | Robinson et al. | 180/14 |
| 2,826,090 | 3/1958 | Grinnell et al. | 74/493 |
| 3,338,595 | 8/1967 | Bogie | 280/446 |
| 3,362,727 | 1/1968 | Malherbe | 280/446 |

*Primary Examiner*—Benjamin Hersh
*Assistant Examiner*—Robert R. Song
*Attorney*—Wm. H. Dean

[57] ABSTRACT

A sway control for a trailer mounted on trailer tongue between the trailer and the towing vehicle utilizing cable means and a drum friction clutch utilizing pivotal means for interconnection between the vehicles. In combination with the clutch, the invention comprises idler pulleys spaced from said clutch and over which cables of the invention project, and means for releasably pivoting at least one of the pulleys to slack the cable in order to permit detachment of the ends of the cable from added structure to the towing vehicle; said invention also comprising novel details of the drum and the manner in which the opposite portions of the cables are substantially contiguous with each other at the periphery of the drum and extending in opposite directions toward the idler pulleys; said opposite portions of said cable wound helically around said drum in opposite directions and toward opposite ends of said drum from a location of said cable portions where they are contiguous with each other such that said opposite portions may reciprocate with each other and always be very close to axial alignment with each other as they extend in opposite directions to said idler pulleys. Said idler pulleys are positioned on a mounting bar or brackets so as to be in close vertical alignment with the cables as they extend outwardly at the point where they are contiguous.

13 Claims, 10 Drawing Figures

Patented May 2, 1972

INVENTOR.
WILLIAM L. RENDESSY.
BY
Willard S. Grow
ATTORNEY.

Patented May 2, 1972
3,659,874
3 Sheets-Sheet 2
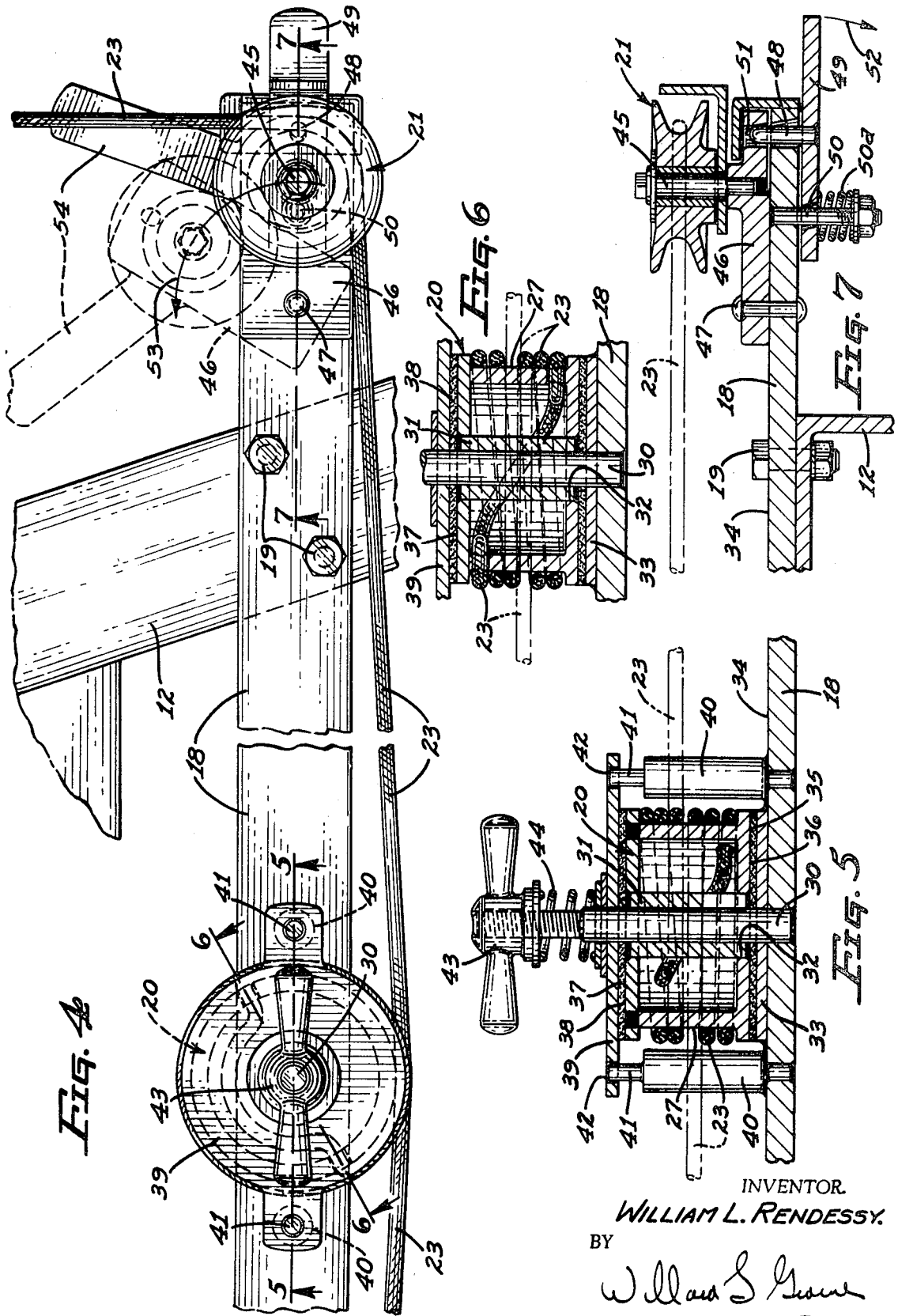
INVENTOR.
WILLIAM L. RENDESSY.
BY
William S. Grove
ATTORNEY INVENTOR.
WILLIAM L. RENDESSY
BY
Wm. H. Dean 3,659,874

SWAY CONTROL FOR TRAILER HITCH

This application is a continuation-in-part of co-pending applications of William L. Rendessy, Ser. No. 638,412, filed May 15, 1967, and Ser. No. 763,843, filed Sept. 30, 1968, for Sway Control for Trailer Hitch, both now abandoned.

BACKGROUND OF THE INVENTION

1. The field of this invention lies in the trailer hitch apparatus for interconnecting vehicles, and is particularly directed to sway control mechanism for use with such trailer hitches.

2. In the past trailer hitch sway control devices have been difficult to quickly and easily attach between vehicles without major fitting and adjustments being required.

Further, the efficiency of the damping action and control has been greatly lacking because of the close proximity of the braking device with the axis of pivoting of the trailer hitch connection between the vehicles.

Prior art devices also lack structure providing for substantial alignment of opposite portions of the cable extending from the braking drum to idler pulleys such that the opposite portions of the cable may reciprocate back and forth over the idler pulleys, while maintaining substantial axial alignment at their connection with the braking or damping drum mechanism.

SUMMARY OF THE INVENTION

The present invention comprises a novel sway control for trailer hitches employing novel combination of a damping drum with cables wound therearound and having opposite portions substantially contiguous to each other to maintain reciprocal alignment of the cables as they extend to idler pulleys, one of which is pivotally releasable to permit the cable mechanism of the invention to be slackened so that it may readily and easily be disconnected from the towing vehicle and to provide manual means to determine drum resistance.

The damping drum mechanism of the invention, which maintains substantial axial alignment of opposed cable portions wound thereon, prevents displacement of the cables on the drum and maintains accurate tensioning and frictional damping with respect to said cables and thus tends to prevent lateral swaying of a trailer towed by a towing vehicle.

A further object of the invention is to provide a sway control for a trailer comprising novel mounting means for a damping drum mechanism and idler pulleys so as to permit the most efficient use of space on or about the tongue of a trailer to thereby accommodate the disposition of various items, such as gas bottles, or the like. Further, the invention also comprises means for mounting the damping drum mechanism of the invention, such that it may conform to various frontal configurations of a trailer body, such as horse trailers, or the like.

It is an object of this invention to provide a sway control for a trailer which is easily installed and interconnected between the vehicles.

Another object is to provide a trailer hitch sway control having high efficiency and maximum frictional control and adjustment.

And a further object of this invention is to provide a sway control between a trailer and a towing vehicle which takes advantage of the maximum swinging movement between the vehicles to provide a more satisfactory and efficient restraint to the swaying motion between the vehicles under all road operating conditions.

BRIEF DESCRIPTION OF THE DRAWINGS

FIG. 4 is an enlarged fragmentary plan view of a portion of the sway control device shown in FIG. 1.

FIG. 5 is an enlarged fragmentary sectional view on the line 5—5 of FIG. 4.

FIG. 6 is an enlarged fragmentary sectional view on the line 6—6 of FIG. 4.

FIG. 7 is an enlarged fragmentary sectional view on the line 7—7 of FIG. 4.

FIG. 10 is a view similar to FIG. 9, but showing brackets for supporting the idler pulleys on diverging portions of a trailer tongue, and to thereby eliminate a cross bar, such as disclosed in FIG. 9, and to afford substantial free space in the front of the trailer body for use in carrying gas bottles, or the like, or to accommodate a convex frontal portion of a trailer between the operating cables of the invention, and to thereby permit construction of the trailer body to assume such configuration as may be desired in the construction of a horse trailer, or the like.

DESCRIPTION OF THE PREFERRED EMBODIMENT

Figure 1:
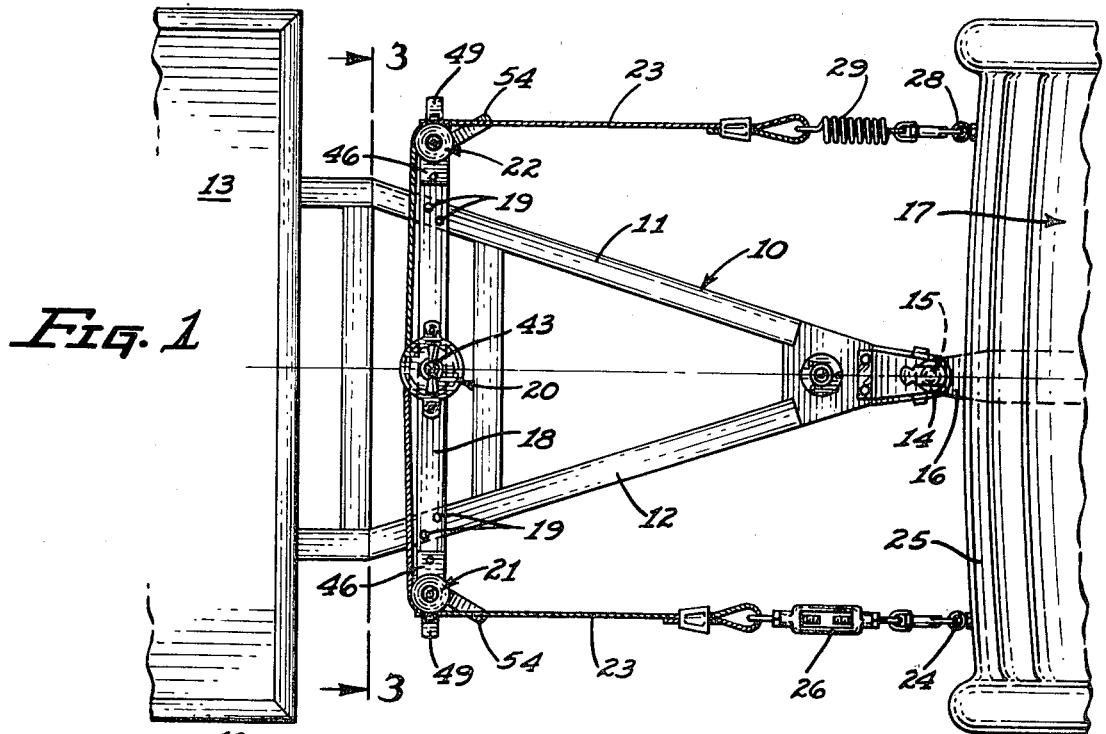
FIG. 1 is a plan view of a sway control device for a trailer hitch incorporating the features of this invention.

As an example of a preferred embodiment of this invention, there is shown a trailer tongue 10 comprising a frame consisting of the arms 11 and 12 suitably fixed to the trailer 13 and having at their forward ends the usual trailer hitch socket 14 received demountably by the usual trailer hitch ball 15 carried on the frame 16 attached to the motor vehicle 17 towing the trailer 13.

Fixed to the arms 11 and 12 of the trailer hitch 10 by suitable bolts 19 is the transverse mounting bar 18 having a friction sway control drum indicated generally at 20 and a pair of laterally spaced idler pulleys at the outer ends of the transverse mounting bar 19 indicated generally at 21 and 22 each side of the drum 20. A control cable 23 has one end connected to a pivotal connection such as an eyebolt 24 secured to an operationally disposed position on the towing vehicle 25, and if desired, through a turnbuckle 26, the cable passing over idler pulley 21 to a position of vertical alignment on the periphery of the drum and then making several turns around the peripheral surface 27 of the drum 20, then through the inner cavity of the drum, where it is operationally immovable, and continuing out of the drum. The cable thus has two fixed portions. The cable is wound around the drum oppositely to the first wound portion until adjacent to it, and over the other idler pulley 22 in vertical alignment to have its other end connected to the operationally disposed eyebolt 28 fixed to the towing vehicle 25, if desired, through a tension spring 29, the intermediate portion of the cable 23 being thus secured and fixed to the drum 20 against slipping on the periphery thereof.

In addition to the foregoing, it will be seen from an inspection of FIGS. 4, 5 and 6 of the drawings that opposite portions of the cable 23 extending from the drum 27, that these opposite portions are contiguous at the periphery of the drum, and in substantial axial alignment as they extend toward the idler pulleys 21 and 22 in close vertical alignment in order to prevent lateral displacement of the cables on the drum as the cables reciprocate with each other during turning of the trailer and the towing vehicle.

The opposite portions of the cable being substantially contiguous with each other at the periphery of the drum and extending in opposite directions toward the idler pulleys always maintain the cables in proper position and in proper tension relationship to each other. The opposite portions of the cable are wound helically around the drum in opposite directions and toward opposite ends of the drum from a location of the cable portions where they are contiguous with each other such that said opposite portions may reciprocate and always be very close to axial alignment with each other as they extend in opposite directions toward said idler pulleys. As shown in FIG. 5 of the drawings and indicated by broken lines, these cable portions which extend oppositely toward the idler pulleys 21 and 22 are disposed near the middle of the drum so that there is a minimum of angular displacement of the opposite portions of the cable and so that fairly constant tensioning may be attained and so that the cables extending oppositely from the drum do not tend to be laterally displaced on the drum at any time. Additionally, this disposition of the cables on the drum being tangential from the same side as shown in FIG. 4 and in the middle of the drum and in substantial axial alignment with each other provides for most efficient damping and reciprocal action of uniform nature and of a very reliable nature which effectively prevents the cables from being displaced or wound in an undesirable condition on the drum 27.

Furthermore, it will be noted that the drum is disposed axially between both friction plates and the tensioning plate is at one end of the drum while the frame 18 is at the other end, thus interposing the entire drum between a pair of friction plates operating efficiently at opposite ends of the drum. This provides for considerable braking and dramping service area on the drum with a given sized drum and provides an optimum adjustable tensioning fuction.

The drum 20 is journaled for free axial movement on the shaft 30 fixed to the mounting bar 18 in a suitable bushing 31 fixed in the bore 32 of the drum. A friction plate 33 is fixed to the top surface 34 of the mounting bar 18 on top of which is provided a friction disc 35 of suitable material which engages the bottom surface 36 of the drum 20. On the top surface 37 of the drum 20 is placed the friction disc 38 and on top of that disc is the pressure plate 39 which is located about the drum shaft 30 and is held from rotation by the torque pins 40 fixed to the bar 18 and having reduced ends 41 projecting through clearance holes 42 near the periphery of the pressure plate 39. A friction regulating hand nut 43 which may incorporate cam lock means is threadedly mounted on the top end of the drum shaft 30 for applying adjustable thrust through the compression spring 44 to the pressure plate 39 is to regulate the frictional drag on the rotation of the drum 20 by the friction discs 36 and 38 to thereby regulate the sway control effect of the device.

Each of the idler pulleys 21 and 22 is journaled on studs 45 fixed in the outer ends of the brackets 46 pivotally mounted on suitable pins 47 carried in the outer ends of the transverse mounting bar 18 where only one pivotal bracket 46 is used for releasing cable tension, the portion of cable from the lowered pulley is disposed to the lower wound portion of cable on the dru. A latch pin 48 is mounted on a swinging and downwardly movable trip lever 49 carried on a pin 50 fixed in the outer end of the bar 18 with a compression spring 50a mounted thereon to normally swing the lever 49 so as to present the latch pin to the positioning hole 51 in the idler bracket 46 to hold the cable 23 in normal operative position. In order to release tension in the cable from normal operative position, the lever 49 is pushed downwardly as indicated by the arrow 52 to remove the upper end of the latch pin from the positioning hold 51 and allow the brackets 46 to be swung in the direction of the arrows 53 by means of the levers 54, integrally attached to the brackets, to release tension in the cable 23 so that it may be readily unhooked from the eyelets 24 and 28 on the bumper 25 so that the hitch 14–15 may be disconnected.

Figure 3:
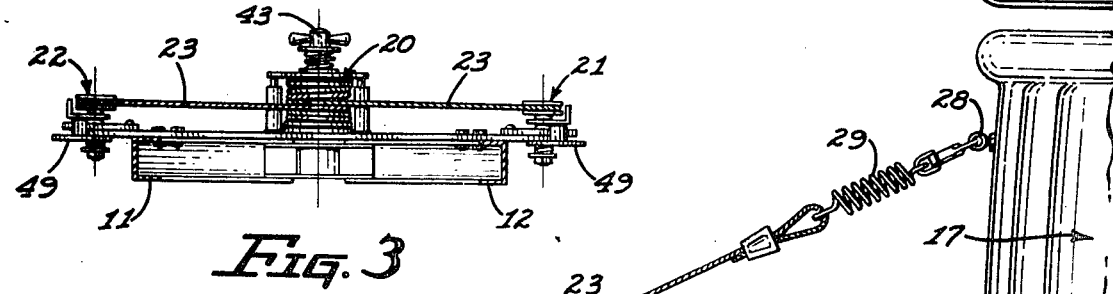
FIG. 3 is a transverse sectional view on the line 3—3 of FIG. 1.
Figure 2:
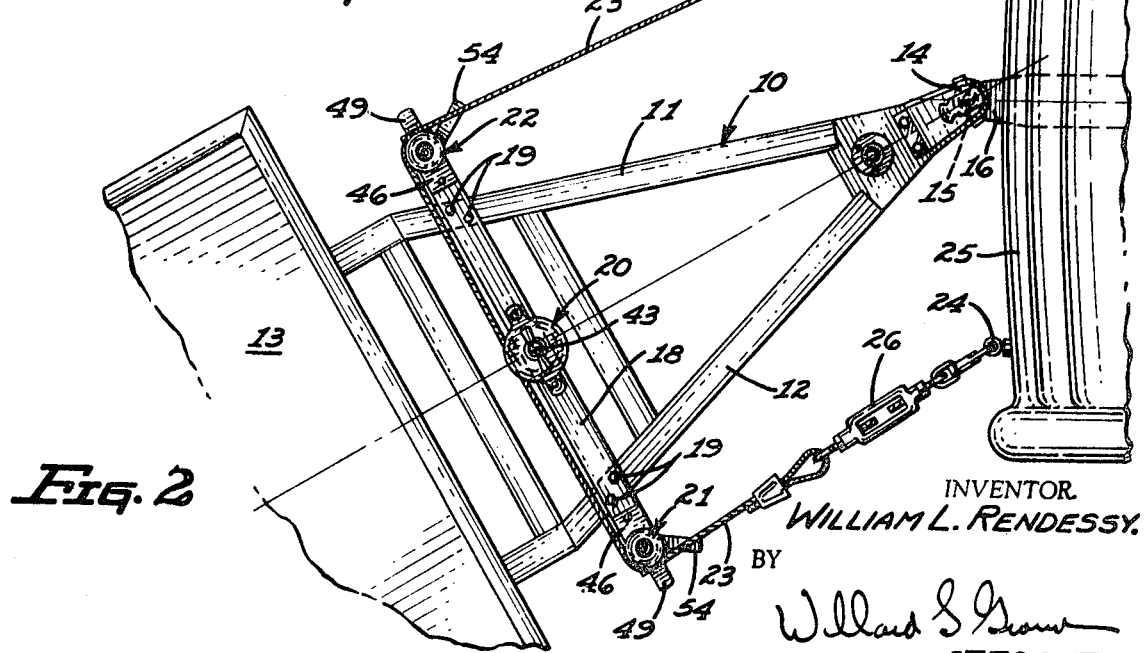
FIG. 2 is a plan view similar to FIG. 1, but showing the vehicles in relative swung position going around a curve.
Figure 8:
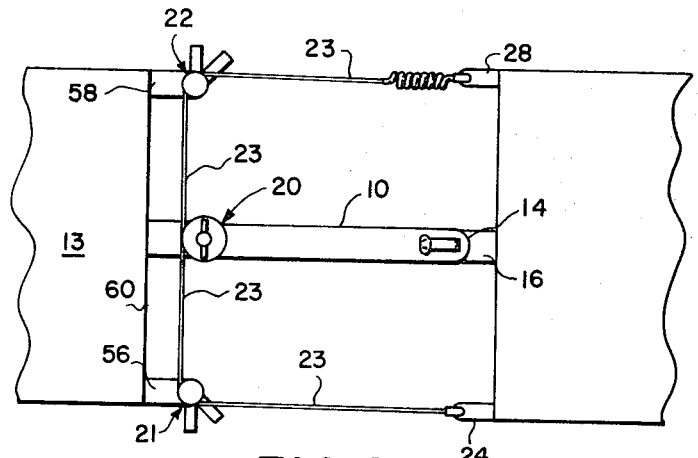
FIG. 8 is a reduced fragmentary top or plan view of a towing vehicle and trailer and showing the mounting of the damping drum mechanism of the invention on a trailer tongue and the idler pulleys of the invention being mounted on the body of the trailer.

As shown in FIG. 8 of the drawings, a modified mounting for the invention is provided comprising a trailer hitch tongue 70 which in a straight single member and on which the damping drum 20 is mounted in a similar manner to that disclosed in FIGS. 1 and 3 of the drawings. It will be seen however that a cross bar 18 is not utilized in the mounting, as shown in FIG. 8, and that the idler pulley assemblies 21 and 22 are mounted on brackets 56 and 58 which are carried on a frontal portion 60 of the body of the trailer 13. In this manner, the tongue 10 of a single channel structure or other suitable section may carry the damping drum 20 and the brackets 56 and 58 on the body 13 may carry the idler pulleys 20 and 21 so that the bar 18 is not needed in connection with the present invention, as shown in FIG. 8 of the drawings.

Figure 9:
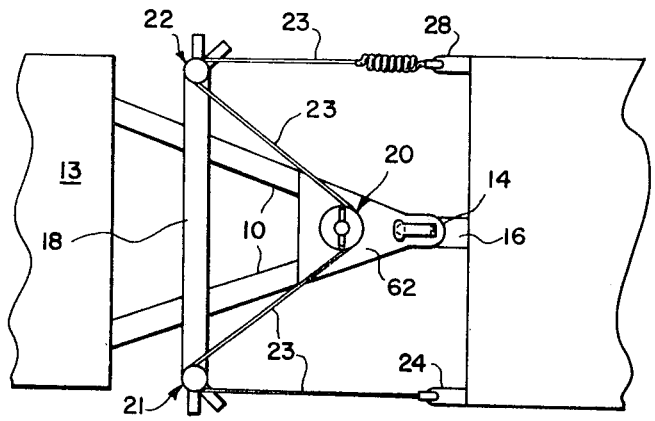
FIG. 9 is a view similar to FIG. 8, but showing a further modification of the invention, wherein a bar is used on the trailer tongue to mount the idler pulleys of the invention and the damping drum mechanism of the invention is mounted forwardly near the hitch ball mechanism at the forward end of the trailer tongue so as to afford substantial space on the trailer tongue which is not transversed by operating cables of the invention.

In the configuration of the invention, as shown in FIG. 9 of the drawings, the bar 18 is utilized to support the idler pulley assemblies 21 and 22 at its opposite ends. However, the damping drum mechanism 20 is carried on a plate 62 at a forward end of the trailer tongue 10 which is composed of a pair of converging channel or other structural members. The drum 20 being located as shown in FIG. 9, maintains the cable portions 23 in a forwardly converging disposition as they extend from the idler pulleys 21 and 22 to the drum 20.

In this manner, various articles, such as gas bottles or the like, may be mounted on the bar 18 or between the front forwardly converging cable portions 23, and thus the cable portions and drum 20 are not located in an interferring position with various items which may be carried on the trailer tongue forwardly of the body portion 13.

Figure 10:
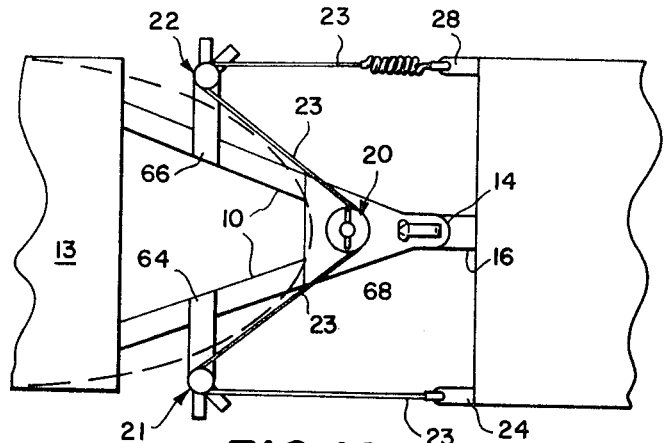

As shown in the configuration of the invention disclosed in FIG. 10, brackets 64 and 66 are secured on forwardly converging portions of the trailer tongue 10 and in this manner, the central section of the bar 18, as shown in FIGS. 1 and 9, may be eliminated to provide open space in the forward portion of the area over the tongue 10 to accommodate a forwardly directed convex portion 68 of a trailer body, said portion being indicated by broken lines as compared to the solid line disclosure of the conventional body 13. Thus, the brackets 64 and 66 may be secured either to opposite sides of the tongue or to opposite sides of the forwardly extending trailer body, as indicated by broken lines 68. In this position, the drum 20 and the cables 23 are out of interference with the forwardly extending body portion and the cables 23 converge forwardly from the idlers 21 and 22 to the drum 20, all as shown best in FIG. 10 of the drawings.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendant claims are intended to be included herein.

I claim:

1. In a sway control for trailers, the combination of: a trailer with a trailer tongue; a mounting member fixed to said trailer tongue; a yieldingly restrained drum rotatably mounted on said member; a pair of laterally spaced idler pulleys journaled on said mounting member and spaced oppositely away from said drum; a demountable pivotal connection on said trailer tongue for interconnecting said tongue to a towing vehicle; a cable means wrapped around and secured to said drum; said cable means having opposite portions laterally disposed and directed outwardly and over said idler pulleys; means for demountably connecting the outer ends of said cables at laterally spaced locations from said pivotal hitch connection, to said towing vehicle; and means for adjusting suitable length of said cable means; said opposite portions of said cable means at said drum being wound around said drum helically toward opposite ends thereof from a position at which said opposite portions are substantially contiguous with each other, whereby said opposite portions may rotatably reciprocate and wind around said drum and always be very close to axial alignment with each other as they extend in opposite directions from said drum to said idler pulleys.

2. The invention, as defined in claim 1, wherein; said yieldingly restrained drum includes adjustable means to vary the frictional loading of said drum for restraining pivotal movement of said trailer hitch and the towing vehicle.

3. The invention, as defined in claim 2, wherein: said drum at its opposite axial ends is provided with friction plate engaging surfaces; a mounting plate adapted to be supported on a trailer tongue; one of said frictional plate engaging surfaces being adjacent to said mounting plate; said mounting plate having a pivot member on which said drum is rotatably mounted; a tensioning plate disposed over and concentrically disposed relative to said pivoted members; said tensioning plate adapted to engage the other of said frictional surfaces at the opposite end of said drum; resilient tensioning means adapted to force said tensioning plate toward said drum and thereby frictionally loading both of said frictional surfaces adjustably for damping rotational movement of said drum as urged by said tension in said cables; said cables being secured at opposite portions of said drum, such that said oppositely secured cables are oppositely and helically directed from said oppositely secured portions on said drums toward the middle portion of said drum where they are substantially adjacent and substantially contiguous and in a nearly axially aligned position relative to each other as they extend in opposite directions from the periphery of said drum.

4. The invention as defined in claim 2, wherein said drum at its opposite axial ends is provided with friction plate engaging surfaces; and one of said friction plate engaging surfaces being adjacent to a mounting plate; said mounting plate having a pivot member on which said drum is rotatably mounted; a tensioning plate disposed over the concentrically disposed relative to said pivot member; said tensioning plate adapted to engage the other of said friction surfaces at the opposite end of said drum; and screw threaded and resilient tensioning means adapted to force said tensioning plate toward said drum and thereby frictionally loading both of said friction surfaces adjustably for damping rotating movement of said drum as urged by tension in said cables.

5. The invention, as defined in claim 2, wherein; said drum at its opposite axial ends is provided with friction plate engaging surfaces; a mounting plate adapted to be supported on a trailer tongue; one of said friction plate engaging surfaces being adjacent to said mounting plate; said mounting plate having a pivot member on which said drum is rotatably mounted; a tensioning plate disposed over and concentrically disposed relative to said pivoted member; said tension plate adapted to engage the other of said frictional surfaces at the opposite end of said drum; resilient tensioning means adapted to force said tensioning plate toward said drum and thereby frictionally loading both of said frictional surfaces adjustably for damping rotational movement of said drum as urged by tension in said cables; said drum being provided with openings extending therethrough adjacent opposite ends thereof; and an intermediate portion of said cable means is extended through said openings, such that said opposite portions of said cable are helically directed form said openings toward the middle portion of said drum at which said opposite protions of said cable are substantially contiguous and in a nearly axially aligned position relative to each other.

6. The invention, as defined in claim 1, wherein: said trailer is provided with a body; a pair of brackets supporting said idler pulleys in spaced relation to each other thereon; said trailer tongue comprising a single bar member and said drum being mounted on said single bar member between said idler pulleys.

7. The invention, as defined in claim 1, wherein: said drum is mounted on said tongue in a position forwardly relative to said idler pulleys, such that cables extending from said idler pulleys forwardly to said drum converge in a direction toward said drum.

8. The invention, as defined in claim 1, wherein: said trailer is provided with a body and brackets are provided for mounting said idler pulleys near opposite sides of said body; said drum being mounted on a forward portion of said tongue, said cables extending from said idler pulleys in a converging forward direction to said drum to afford unrestricted space between said idler pulleys and between said forwardly converging cables.

9. The invention, as defined in claim 1, wherein: said opposite portions of said cable at said drum being wound around said drum helically toward opposite ends thereof from a position at which said opposite portions are substantially contiguous with each other, whereby said opposite portions may rotatably reciprocate and wind around said drum and always be very close to axial alignment with each other as they extend in opposite directions from said drum to said idler pulleys.

10. The invention, as defined in claim 1, wherein: at least one of said idler pulleys is readily movably mounted laterally of its axis on said mounting member to permit movement of said idler pulley to cause slackening of said cable and to permit said cable readily to be released from said towing vehicle; and latch means adapted to hold said idler pulley in position with relation to said mounting member to maintain tension in said cable when it is connected for operation with said towing vehicle.

11. The invention, as defined in claim 1, wherein said drum is provided with openings therethrough adjacent opposite ends thereof and an intermediate portion of said cable is extended through said openings such that said opposite portions of said cable are helically directed from said intermediate portion toward the middle portion of said drum at which said opposite protions of said cable are substantially contiguous and in a nearly axially aligned position relative to each other.

12. A sway control for a trailer hitch comprising in combination:
A. a mounting member fixed to the trailer hitch;
B. a yieldingly restrained drum rotatably mounted on said member;
C. laterally spaced idler pulleys journaled on said mounting member each side of said drum;
D. a demountable pivotal connection on said trailer hitch for interconnecting said hitch to a towing vehicle;
E. an operating cable having its intermediate portion wrapped around and secured to said drum with its ends extending laterally outwardly therefrom and over said idler pulleys;
F. and means for demountably connecting the outer ends of said cable at laterally spaced points from said pivotal hitch connection to said towing vehicle; at least one of said spaced idler pulleys journaled on a bracket pivotally mounted on said mounting member; and a releasable latch interconnected between said bracket and mounting member for movement relative to said drum to relieve normal operative tension in said cable and to facilitate unhooking the cable end from connection with the towing vehicle and for determining the amount of frictional restraint exerted by said drum.

13. In a sway control for trailer hitches, the combination of a cable means having opposite ends and an intermediate portion, said intermediate portion having opposite portions, said opposite ends adapted to be removably connected in spaced apart relation and with a towing vehicle; a plurality of spaced apart rotary means engageable with said intermediate portion of said cable means and adapted to be carried by a trailer vehicle; at least one of said rotary means having a frictionally damped rotor; said opposite portions being wound around said damp rotor helically toward said opposite ends from a position at which said opposite portions are substantially contiguous with each other, whereby said portion may rotatably reciprocate and wind around said damped rotor and always be very close to each other as they extend in opposite directions from said rotor, said opposite ends of said cable means extending from said plurality of said rotary means; connection means adapted removably to connect said opposite ends of said cable means to the towing vehicle; means movably mounting at least one of said rotary means to move said at least one of said rotary means in a direction to permit a slack condition of said cable means when it is desired to hitch or unhitch said opposite ends of said cable relative to a towing vehicle; and releasable means adapted normally for holding said last-mentioned rotary means in a stationary position in which said cable means is held tight over said plurality of said rotary means.

* * * * *